(12) United States Patent
Buchan et al.

(10) Patent No.: US 8,939,702 B2
(45) Date of Patent: Jan. 27, 2015

(54) SUB-SEA APPARATUS AND OPERATING METHOD

(75) Inventors: Andrew Buchan, Aberdeen (GB); Murray Jamieson McIntosh, Inverurie (GB)

(73) Assignee: Subsea 7 Limited, Sutton (GB)

( * ) Notice: Subject to any disclaimer, the term of this patent is extended or adjusted under 35 U.S.C. 154(b) by 192 days.

(21) Appl. No.: 13/635,337

(22) PCT Filed: Mar. 18, 2011

(86) PCT No.: PCT/GB2011/050552
§ 371 (c)(1),
(2), (4) Date: Dec. 10, 2012

(87) PCT Pub. No.: WO2011/114172
PCT Pub. Date: Sep. 22, 2011

(65) Prior Publication Data
US 2013/0071191 A1   Mar. 21, 2013

(30) Foreign Application Priority Data

Mar. 19, 2010   (GB) .................................. 1004568.0

(51) Int. Cl.
*F16L 1/26* (2006.01)
*E21B 41/04* (2006.01)
*E21B 43/013* (2006.01)

(52) U.S. Cl.
CPC .................. *F16L 1/265* (2013.01); *E21B 41/04* (2013.01); *E21B 43/0135* (2013.01); *F16L 1/26* (2013.01); *Y10S 901/41* (2013.01)
USPC ...................... 414/745.4; 405/170; 405/184.4; 269/43; 901/41

(58) Field of Classification Search
USPC .............. 138/97, 99; 166/338, 341; 228/44.5; 248/49; 269/43, 46; 285/15; 29/237, 29/271, 272; 294/67.31, 81.61; 405/158, 405/169, 170, 173, 184.1, 184.3, 184.4, 405/184.5
See application file for complete search history.

(56) References Cited

U.S. PATENT DOCUMENTS

| | | | | |
|---|---|---|---|---|
| 2,692,159 | A * | 10/1954 | Croswell et al. | 294/81.61 |
| 3,578,233 | A | 5/1971 | Meister et al. | |
| RE31,265 | E * | 6/1983 | Sinclair et al. | 405/169 |
| 4,436,449 | A | 3/1984 | Smoot et al. | |
| 5,118,024 | A * | 6/1992 | McClure | 228/44.5 |
| 6,767,165 | B1 * | 7/2004 | Corbetta | 405/170 |
| 7,086,807 | B2 * | 8/2006 | Mackinnon | 405/170 |
| 7,112,009 | B2 * | 9/2006 | Mackinnon | 405/173 |
| 7,445,404 | B2 | 11/2008 | Giles et al. | |

FOREIGN PATENT DOCUMENTS

| | | |
|---|---|---|
| GB | 781465 | 8/1957 |
| GB | 2276431 | 9/1994 |
| GB | 2304394 | 3/1997 |
| GB | 2343493 | 5/2000 |
| WO | WO 97/15773 | 5/1997 |
| WO | WO 03048518 A2 * | 6/2003 |

* cited by examiner

*Primary Examiner* — Gregory Adams
(74) *Attorney, Agent, or Firm* — Levy & Grandinetti

(57) ABSTRACT

Apparatus and method for handling a fluid-tight flange coupling between a first and a second conduit component while maintaining the fluid integrity of the coupling. The apparatus includes a gripping mechanism configured to straddle the flange coupling and grip both of the first and second conduit components. The gripping mechanism is mounted on a lifting frame able to bear the loadings upon the gripped components during a moving operation. The apparatus includes a base frame with a gripping mechanism to receive the flange coupling. The coupled components are gripped on each side of the flange coupling to maintain the fluid integrity of the flange coupling.

16 Claims, 16 Drawing Sheets

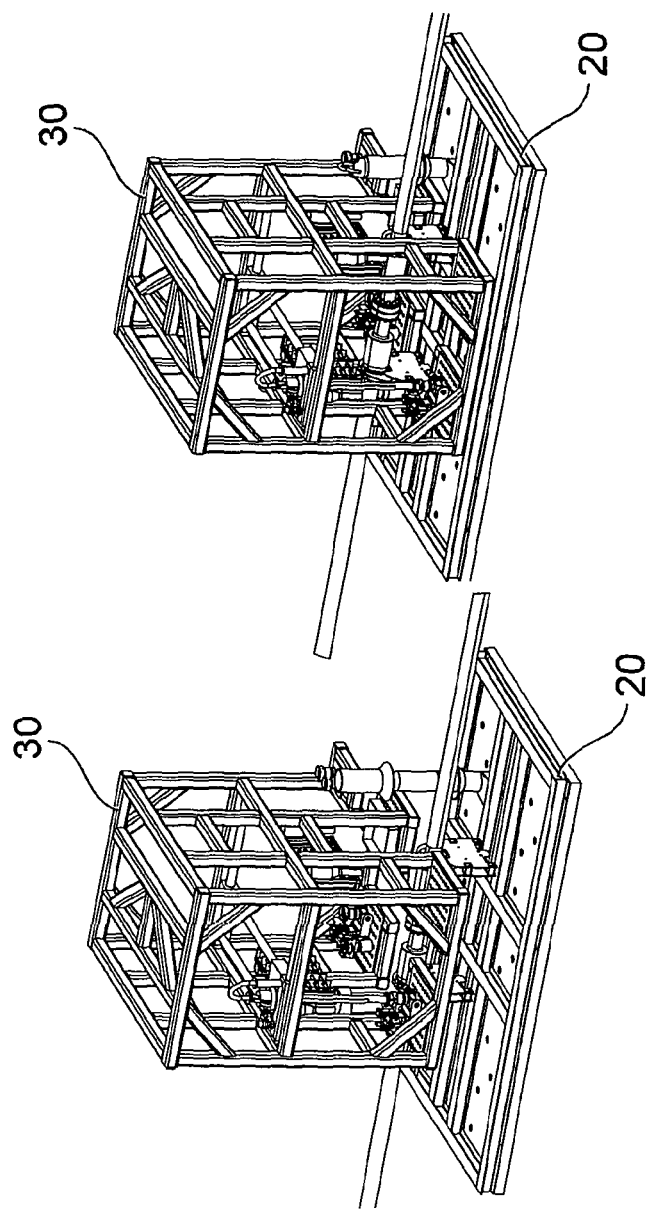

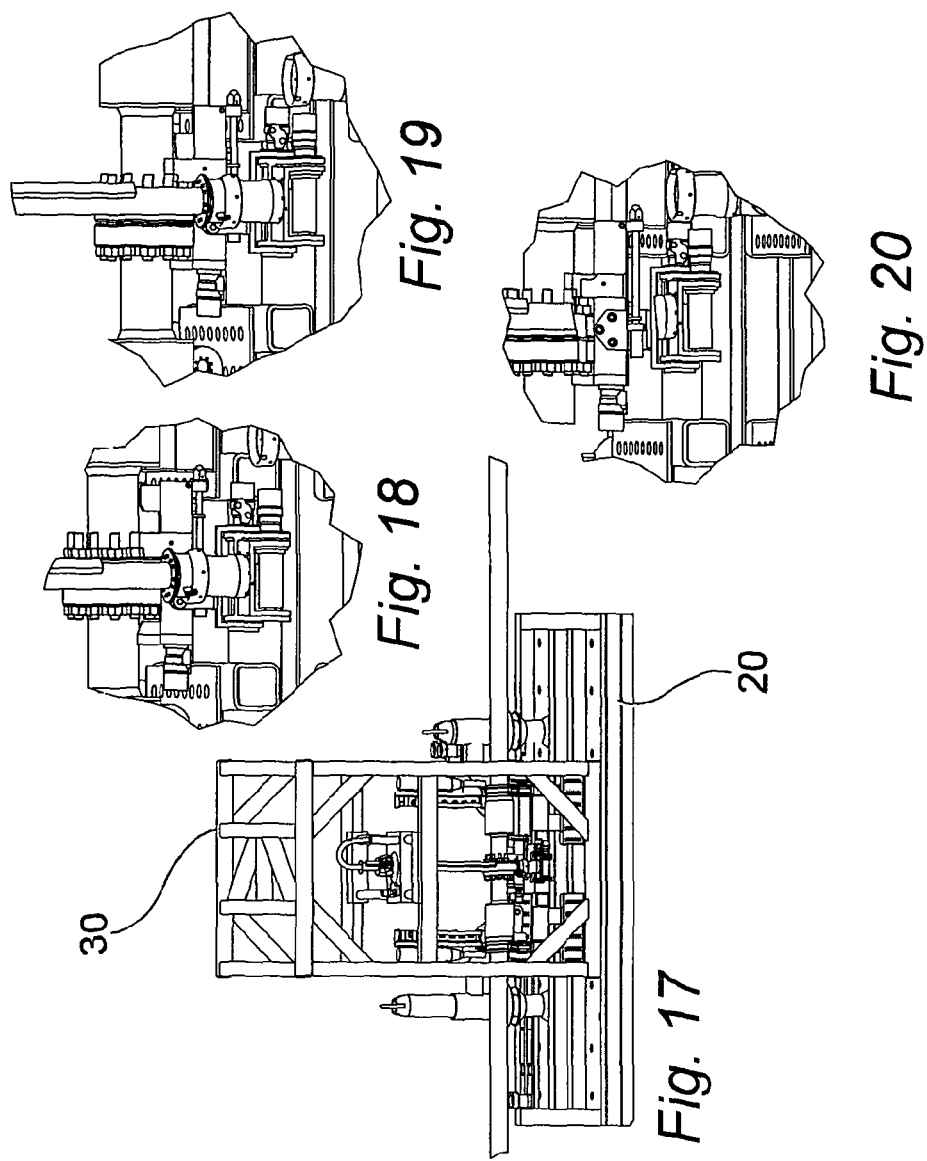

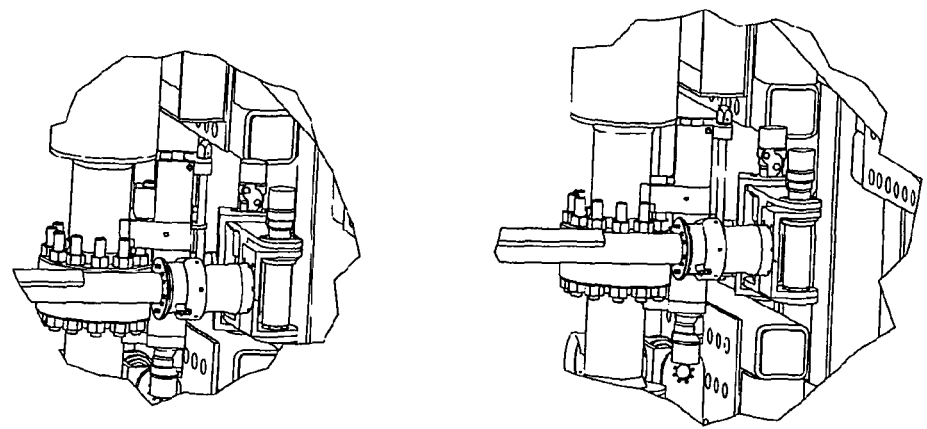
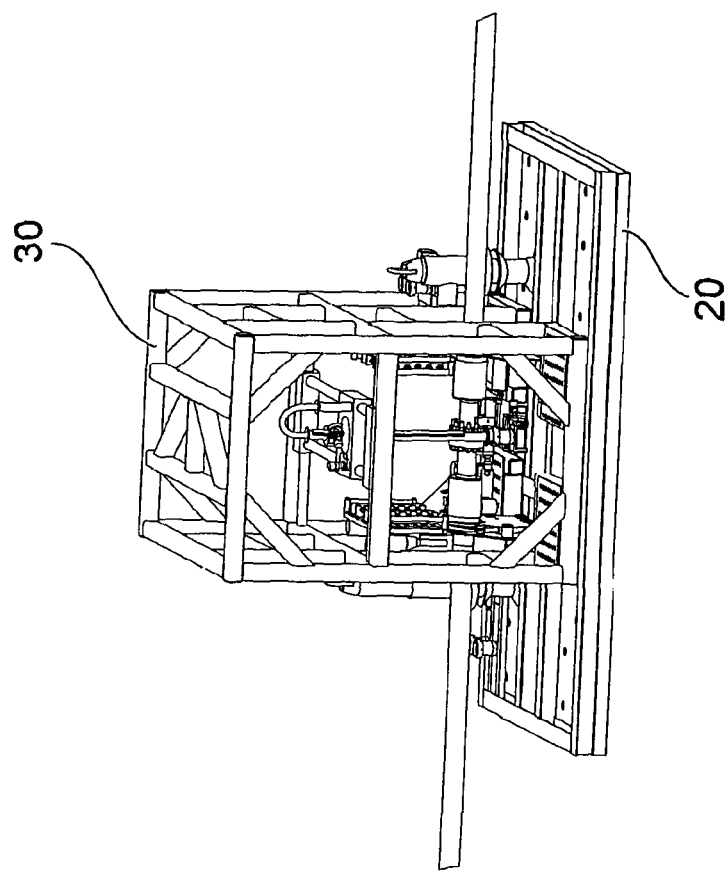
Fig. 24

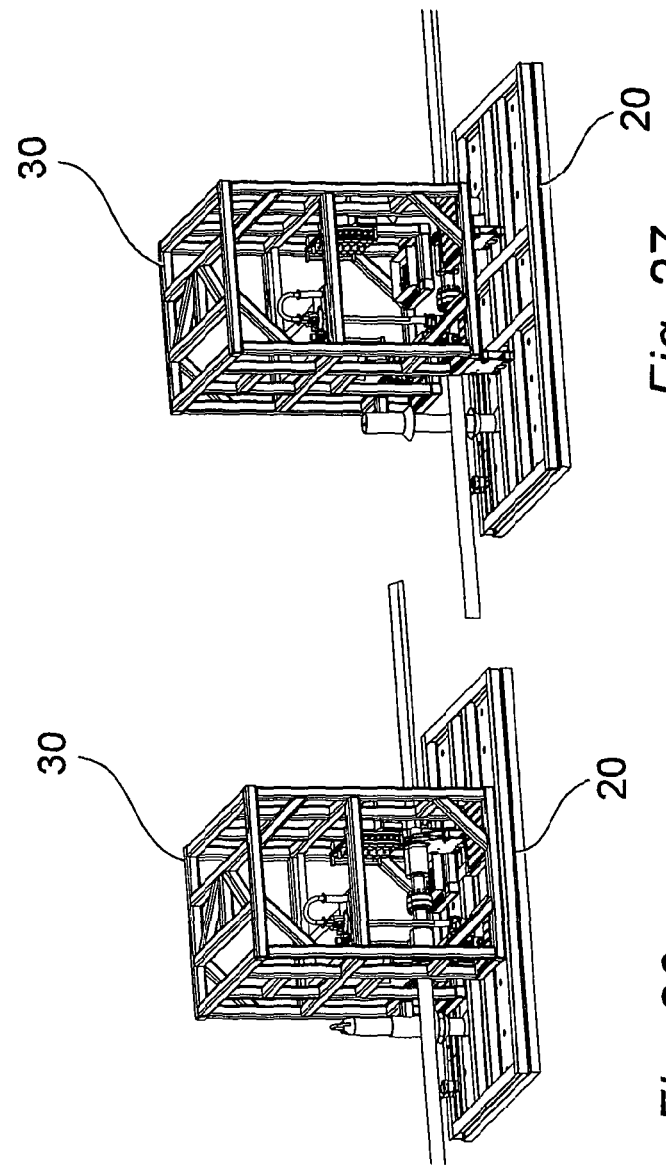

SUB-SEA APPARATUS AND OPERATING METHOD

This Application is the U.S. National Phase of International Application Number PCT/GB2011/050552 filed on Mar. 18, 2011, which claims priority to Great Britain Application No. 1004568.0 filed on Mar. 19, 2010.

FIELD OF THE INVENTION

This invention relates to undersea operations typically required to support and maintain exploitation of oil and gas resources. In particular the invention finds application in servicing the infrastructure and submerged facilities required for subsea field development.

BACKGROUND TO THE INVENTION

Whereas exploitation of land-based oil and gas resources may have peaked, the opportunity to expand exploitation of oil and gas resources at offshore and deep water sites remains. This brings many challenges to the industry ranging from exploration to production. Amongst such challenges is the need to recover the produced resources in a consistent and reliable manner with minimal impact upon the environment.

Typically, the exploitation of a subsea field requires subsea deployment of equipment and establishment of a seabed infrastructure for delivery of product. Multiple wells may be established to exploit a reservoir, and these wells generally will be connected to floating production, storage and offloading (FPSO) units by conduits. These conduits may be bundled flowlines serving multiple purposes including production, annulus access and remote control of the wells. These flowlines may be at least partially buried in the seabed. Riser bundles to the FPSO may be installed in free catenaries.

Intervention may be required from time to time to inspect and maintain such subsea structures and systems. Whereas some subsea operations can be conducted by divers, taking account of the extreme depths of many sites, it is becoming more common to use remotely operated vehicles and tooling to perform the necessary tasks. Thus it may be necessary to undertake a subsea task at extreme depth in order to restore control of a subsea system, repair or replace worn or damaged components, override or bypass a failed component, or install sensors to monitor problem areas.

SUMMARY OF THE INVENTION

In the case of need to intervene in a flowline overlying the seabed (using a remotely operated vehicle (ROV), diver or any other means) care must be taken to avoid rupture of the flowline or any connection between the flowline and another component in the system. The present invention provides apparatus and a method for carrying out a remedial operation upon a subsea conduit system with the objective of minimising risk of an unfavourable outcome. An example of such a remedial operation is the replacement of studbolts in a flange coupling between a conduit and another component which may be another conduit or a subsea structure. Replacement of all flange studbolts cannot be reliably performed with the flange coupling located on the seabed due to loss of visibility and subsequent delay to ROV operations. It will be recognised that flange couplings represent a significant proportion of all seabed connections, and it is therefore convenient to discuss the invention in that context.

According to a first aspect of the invention, there is provided apparatus for handling a fluid-tight flange coupling between a first and a second conduit component whilst maintaining the fluid integrity of the coupling, the apparatus comprising a gripping mechanism configured to straddle the flange coupling and grip both of said first and second conduit components, said gripping mechanism being operatively mounted upon a lifting frame adapted to bear the loadings upon the gripped components during a moving operation, the apparatus including a base frame with a gripping mechanism to receive the flange coupling such that the coupled components are gripped on each side of the flange coupling to maintain the fluid integrity of the flange coupling.

The apparatus may have at least one engagement mechanism, the lifting frame and the base frame being engageable with one another via the engagement mechanism. The engagement mechanism is typically configured to guide the lifting frame and the base frame into engagement with one another. The engagement mechanism may control the interengagement of the lifting frame and the base frame. The first and second conduit components and flange coupling may be positioned using the engagement mechanism so that the gripping mechanism straddles the flange coupling and grips both first and second conduit components. Typically the engagement mechanism controls the alignment of the lifting frame and the base frame during engagement so that the first and second conduits on either side of the flange coupling are received and retained by the gripping mechanism on the base frame on each side of the flange coupling.

The engagement mechanism may comprise at least one guide post on one of the lifting frame and base frame for cooperation with at least one socket on the other of the lifting frame and base frame. The guide post and socket may align the lifting frame with the base frame and/or provide for the first and second conduit components and flange coupling gripped by the lifting frame to be aligned with the gripping mechanism of the base frame.

At least one of the conduit components can be a tubular component.

The moving operation can typically be a lifting operation. The lifting frame can advantageously bear portions of loads on gripped components after the moving operation.

In this arrangement, the use of the straddle gripping mechanism allows the loadings encountered during a lifting or other movement of the flange coupling to be transferred through the gripping mechanism to the lifting frame which acts as a load bridge over the flange coupling and relieves it of excessive loadings during movement which might otherwise cause a shearing or parting of the coupling with loss of fluid-tightness of the coupling.

The lifting frame typically permits axial adjustment of the straddle gripping mechanism either before or after gripping of the components, to move the straddle gripping mechanism towards or away from one another in an axial direction. This assists with alignment and position of the clamps of the straddle gripping mechanism, and can allow the lifting frame to apply compressive force to the flanges to enhance the seal between them, and reduce the risks of fluid loss through the flange coupling during the moving operation.

An advantage of this approach is that the tubular components can continue to serve the intended conduit function allowing "live" or "hot" interventions to an operational system with no down time. The fluid in the conduit can be pressurized or unpressurized.

The lifting frame may be configured for handling by a remotely operated vehicle (ROV) or manually, e.g. by a diver. The lifting frame may be adapted for lifting by a winch or crane, or by a buoyancy device.

Deployment of the frame can be performed by a surface crane to lower the lifting frame to the subsea site and use of an ROV, optionally together with a subsea winch to achieve correct juxtaposition of the frame with respect to the flange coupling requiring an intervention. In some embodiments, an ROV can recover the frame from a subsea location without the requirement for a winch.

The lifting frame may be provided with a hydraulic (or manual or electrical) system operable by an ROV to control the gripping mechanism.

The gripping mechanism may comprise first and second clamp devices (or more than two) mounted upon the frame and spaced apart sufficiently to be positioned respectively on either side of a flange coupling when juxtaposed therewith. The first and second clamp devices may comprise adjustable jaws to accommodate differing sizes of tubular components to be lifted.

The first and second clamp devices may be synchronised to grip components at the same time.

The gripping mechanism may be controlled by an operating system that ensures both first and second clamp devices are secured to the respective coupled tubular components on either side of the fluid tight coupling before permitting a lifting or moving operation. The operating system may include contingency override features to effect release of lift clamps in the case of a malfunction. The operating system may include alarm functions to indicate a malfunction.

The engagement mechanism can comprise an alignment mechanism for cooperation with a base frame to be installed upon the seabed to allow precise positioning for support of flange coupled components during a remedial operation.

The base frame may also comprise a gripping device to receive the flange coupled components when the lifting frame is properly juxtaposed with the base frame. The base frame may optionally incorporate a cradle device to support the lifting frame and/or the tubular components, typically at a location spaced above a surface of the base frame. Advantageously this facilitates access to the flange around the circumference of the flange.

According to another aspect of the invention there is provided apparatus for changing fasteners of a fluid-tight flange coupling whilst the coupling remains fluid tight, the apparatus comprising a base frame with a gripping mechanism to receive flange coupled components such that the coupled components are gripped on each side of the flange coupling to retain the fluid tightness of the flange coupling, and a tool positionable upon the base frame and comprising an arm movable around a gripped flange coupling, which arm is adapted for engaging a fastener and manipulating same to release or tighten the fastener.

The gripping mechanism of the base frame may receive the flange coupled components when the lifting frame is properly juxtaposed with the base frame.

The base frame may incorporate a cradle device to support at least one of the lifting frame and the conduit components, typically at a location spaced above a surface of the base frame.

The arm may be a robotic arm.

The robotic arm may be adapted to apply torque to the fastener, which is preferred over use of a stud tensioner tool which could be used in the performance of the invention, but usually requires more space for access and task performance.

A notable feature of this aspect is that each fastener, which may be a stud and nut fastener, may be discretely manipulated to effect release of the fastener by applying torque thereto whilst the flange coupling is maintained in a fluid tight condition by use of the gripping mechanism on either side of the coupling. Optionally compressive and tensile forces can be applied to the fastener by the tool, for example to tension the bolt before manipulation of the nuts.

The robotic arm may be mounted in a separate tool frame that is adapted to be located upon the base frame. The positioning of the respective frames may be accomplished by provision upon the frames of respective docking posts and cone sockets configured to locate over the docking post.

The robotic arm may be mounted for movement in three dimensions (XYZ axes) and provided with a torque-settable driving head adapted to engage the flats on the head of a fastener such as a studbolt or nut therefor.

The robotic arm may be adapted to be received different tools upon an end effector interchange interface. Typically the end effector interchange interface can incorporate power and signal couplings adapted to communicate power and optionally signals across the interface between the arm and a tool mounted thereon. Different tools mounted on the end effector interchange interface can have different functions, for example torque tools to apply torque to nuts on usable studbolts or nut splitting tools to cut or force seized nuts, but the different tools can optionally have a common power and signal interface to connect to the power and signal couplings on the end effector interchange interface.

A rack of replacement fastener components may be mounted on the tool frame or base frame within access reach of the robotic arm.

According to a still further aspect of the invention, there is provided a method for handling a fluid-tight flange coupling between a first and a second tubular component whilst maintaining the fluid integrity of the coupling, the method comprising presenting a gripping mechanism configured to straddle the flange coupling to the ends of said first and second tubular components, and applying grip to both of said first and second tubular components, said gripping mechanism being operatively mounted upon a lifting frame adapted to bear the loadings upon the gripped components during a subsequent moving operation, the method including the step of lifting the gripped fluid-tight flange-coupled tubular components and moving same to a support equipped with a gripping mechanism, presenting the gripped fluid-tight flange-coupled tubular components to the support so that the gripping devices of the support are located on either side of the flange coupling, and operating the gripping devices of the support to grip the flange-coupled ends of the tubular components.

The method may further comprise the step of lifting the gripped fluid-tight flange-coupled tubular components and moving same to a support equipped with a gripping mechanism, presenting the gripped fluid tight flange-coupled tubular components to the support so that the gripping devices of the support are located on either side of the flange coupling and operating the gripping devices of the support to grip the flange-coupled ends of the tubular components.

The lifting frame may be removed from the flange-coupled tubular components by releasing its gripping mechanism, leaving the flange-coupled tubular components securely held by the gripping mechanism on the support.

In an embodiment of the method as applied to a flange coupled flowline laid over a seabed site, a tool for carrying out an intervention such as changing studbolts on a flange, and a lifting frame equipped with gripping mechanism configured to straddle a flange coupling are delivered to the seabed worksite e.g. by lowering from a surface support vessel crane. The worksite is typically first surveyed by an ROV to clear debris and possibly to reposition a flowline or umbilical into an optimum position.

Marker positioning aids, such as gabions (sandbags) are typically lowered from the support vessel for positioning beside the target flange-coupled tubular components by use of an ROV or diver with assistance from the vessel crane where required.

A support base frame equipped with a gripping mechanism is then typically lowered to the worksite using the support vessel crane.

The support base frame is typically guided into position by the ROV or diver and installed on the seabed against the gabions.

If necessary, the ROV or diver can perform local seabed dredging operations at the flange coupling end fittings to aid installation of the lifting frame.

Optionally a subsea winch is provided for use in the intervention when required, and can optionally be lowered to the worksite by the vessel crane. Winch cables are typically attached and detached by ROV arms. The winch is typically positioned in the correct location by the ROV.

With the aid of the support vessel crane, and the winch when necessary, the ROV moves the lifting frame to position it over the flange coupling to straddle same and align the gripping mechanism with the ends of the tubular components. Once properly juxtaposed with the flange-coupled tubular components the gripping mechanism is operated to clamp the lifting frame in place so as to bridge the flange coupling and securely hold the ends of the flange-coupled tubular components.

Typically, with the aid of the vessel crane, and a subsea winch when required, the flange-coupled tubular components are lifted from the seabed and shifted into position on the support frame under the control of the ROV.

The correct mating of the lifting frame with the support frame may be achieved by provision of docking posts and cone sockets on the respective frames.

Upon completion of the lift and shift tasks the ROV typically operates the support frame gripping mechanism to grip the ends of the respective flange-coupled tubular components. The lifting frame may be removed once the support gripping mechanism is activated to hold the flange-coupled tubular component ends securely.

With assistance from the support vessel crane the ROV typically installs a tool required for the intervention upon the support frame and operatively juxtaposed with the flange-coupling. The tool may be installed in a tool frame adapted to dock with the support frame using respective docking posts and cone sockets. The tool can have two or more joints to facilitate movement of the operative end of the tool in 6 degrees of freedom. The tool can be a torque tool or a gripping tool adapted to apply force to the fasteners.

The ROV can then be used to operate the tool to perform a task such as the substitution of a fastener assembly e.g. a studbolt and nut, which task can be repeated successively until all the studbolts and nuts have been replaced one-by-one. Fasteners removed form the flange can be stored in a basket on the tool frame or the support frame.

After completion of necessary inspections and customary checks the flange-coupled tubular components can be restored to original position by removing the intervention tool, re-positioning the lift frame, operating its gripping mechanism to re-engage the flange-coupled tubular components, releasing the support frame gripping mechanism and re-locating the gripped flange-coupled tubular components using the ROV as before to move the lifting frame back to the original site for deposit of the flange-coupled tubular components. Equipment can be recovered to the vessel and the worksite can optionally be surveyed by the ROV as a final step.

DESCRIPTION OF THE DRAWINGS

FIGS. 7 to 27 show sequential views of an operation using the apparatus to lift a seabed flowline and replace the studbolts thereon.

DESCRIPTION OF EMBODIMENTS OF THE INVENTION

Figure 1:
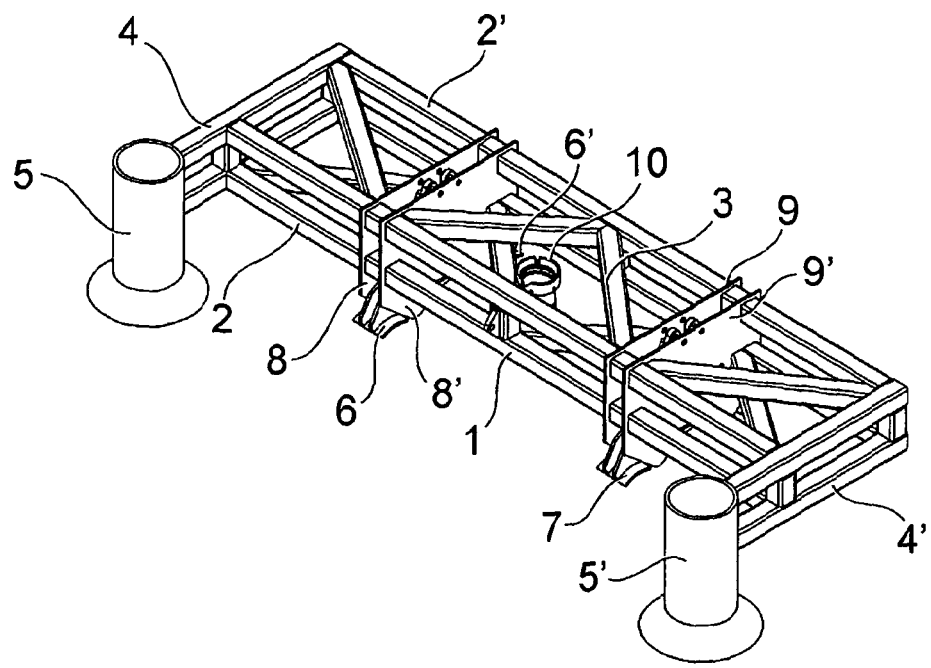
FIG. 1 shows a perspective view from above and to the rear of a lifting frame equipped with spaced apart gripping clamps.
Figure 2:
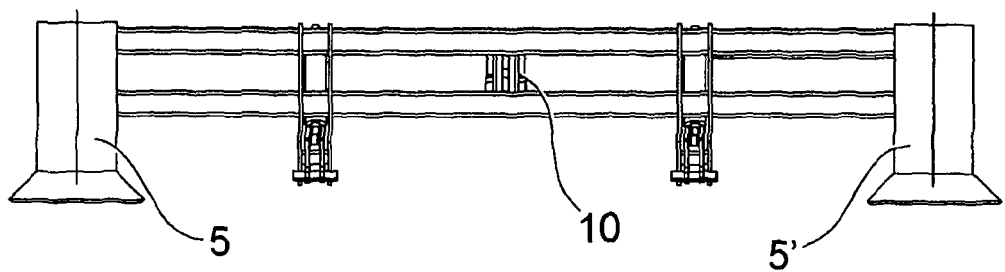
FIG. 2 shows a rear elevation of the lifting frame illustrated in FIG. 1.
Figure 3:
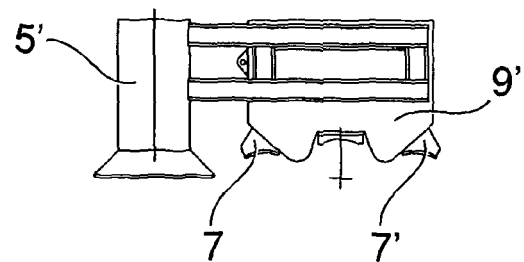
FIG. 3 shows an end elevation of the lifting frame illustrated in FIGS. 1 and 2.

Referring to FIG. 1, there is shown a lift clamp 1 designed to support a fluid-tight flange coupling end-fitting and act as a "strong-back" to reduce the risk of leakage by minimising the exposure of the existing flange coupling fastener, typically stud bolts and nuts, to loads imparted during an operational handling step; in particular those generated during a lift and shift sequence.

The lift clamp 1 comprises a rectangular box frame made from front and rear tubular members 2, 2' with angled cross tie members 3, and side members 4, 4', with docking installation guide cones 5, 5' attached to the respective side members 4, 4'.

A gripping mechanism for engaging an end of a first and second tubular component on either side of a flange connection between tubular components of a flowline (not shown) includes paired clamp jaws 6, 6' and 7, 7' operatively mounted between respective transverse mounting plates 8, 8' and 9, 9'. Hydraulic lines (not shown) for operation of the clamp jaws under the control of a hydraulic system of a ROV are connectable to the gripping mechanism to allow clamping of the ends of the first and second tubular components. Both gripping devices on the gripping mechanism are typically engaged before any movement of the flange-coupled tubular components is contemplated but the gripping mechanism can be operated independently and sequentially or synchronised for simultaneous operation.

The lift clamp 1 is fitted with a hydraulic stabplate receptacle 10 to allow the mating of a corresponding hydraulics line connector on an ROV and subsequent operation of the lift clamp. The position of the gripping devices of the lift clamp gripping mechanism and the clamp jaw grip radius can be adjustable and altered prior to subsea operations to accommodate different sizes of flange coupling end fittings. This can optionally be used after gripping to apply compression to the flange coupling.

The lift clamp 1 is designed to bridge the flange-coupling to engage the ends of the flange-coupled tubular directly and relieve potential loadings upon the flange coupling during a lift and shift operation and thereby minimise risks of shear or parting of the flange-coupling during the operation and maintain the fluid-tight condition of the flange-coupling. Thus the flowline can remain in productive use throughout the intervention.

The lift clamp is used to remove the flowline from the seabed to allow access to the flange-coupling by appropriate tools. In order to facilitate this purpose, a base support frame 20 is provided for the flowline.

Figure 4:
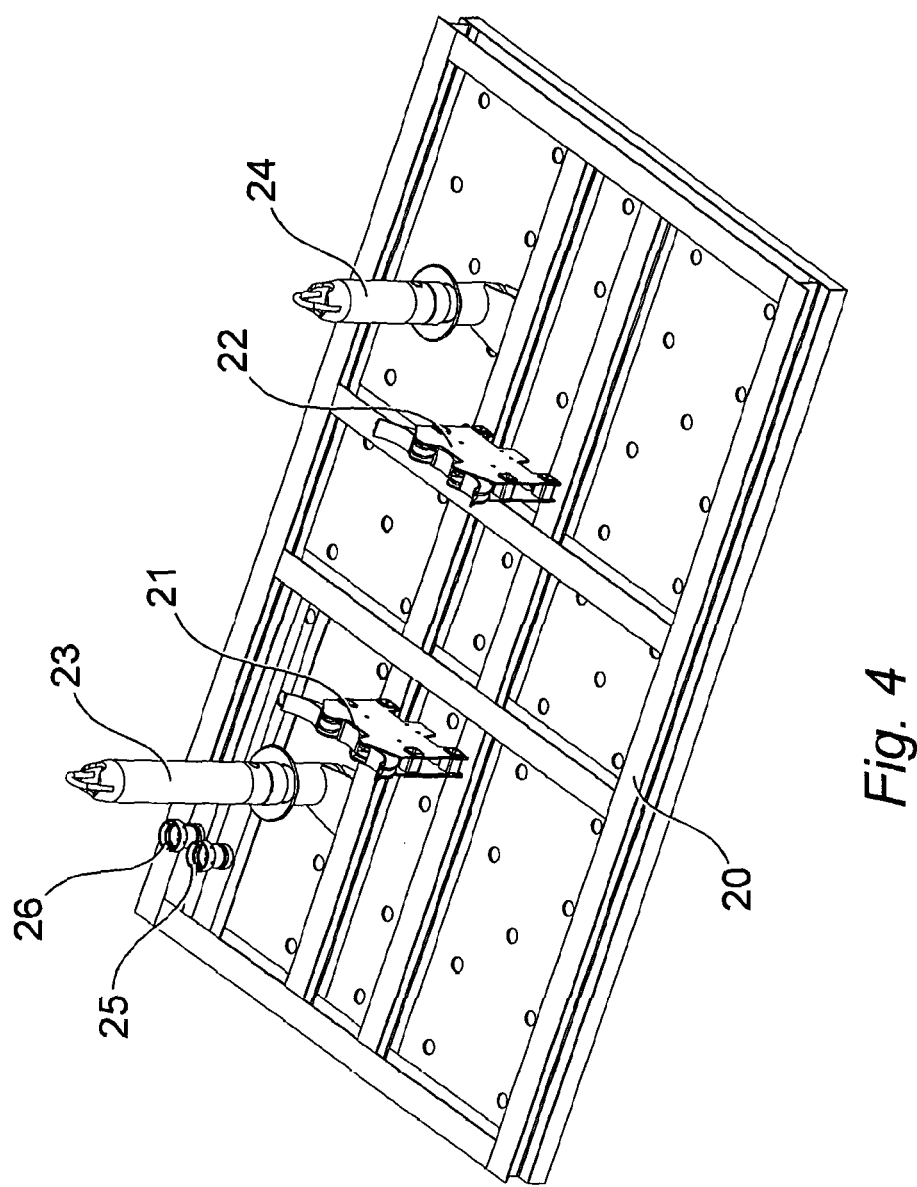
FIG. 4 shows a perspective view from above and to the front of a base frame with spaced apart gripping clamps.

Referring now to FIG. 4, the base support frame 20 has paired upstanding gripping devices 21, 22 spaced apart sufficiently on the support frame 20 to admit the gripped flange-coupling presented by the lift clamp therebetween and allow the jaws of the respective gripping devices 21, 22 to be closed upon the respective ends of the flange-coupled tubular components of the flowline.

The base support frame 20 is equipped with upstanding docking guide posts 23, 24 for cooperation with other equipment to be installed thereon. Two hydraulics stabplate receptacles 25, 26 are provided for connection of a hydraulics control system. The hydraulics can be controlled from an ROV for example to allow the gripping devices 21, 22 to be remotely operated from the ROV.

Figure 6:
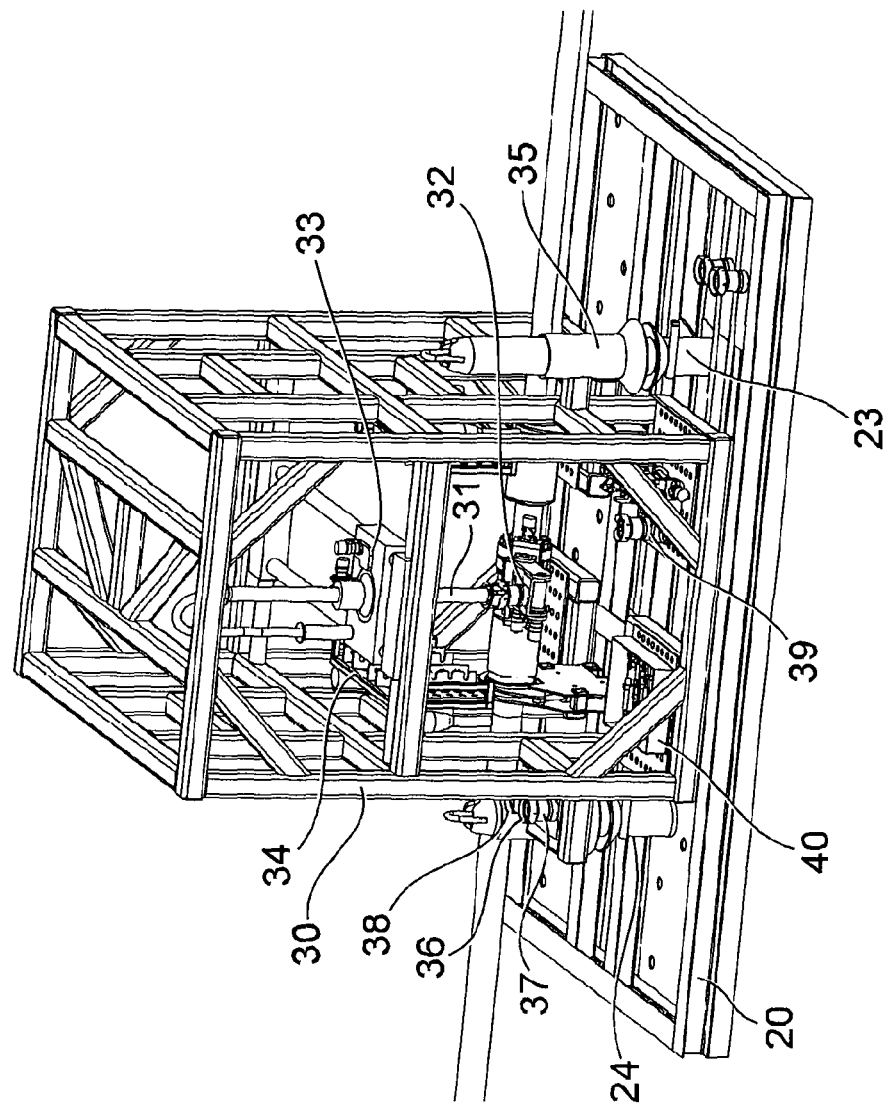
FIG. 6 shows a perspective view from above and to the rear of a tool frame positioned upon the base frame of FIG. 4.
Figure 7:
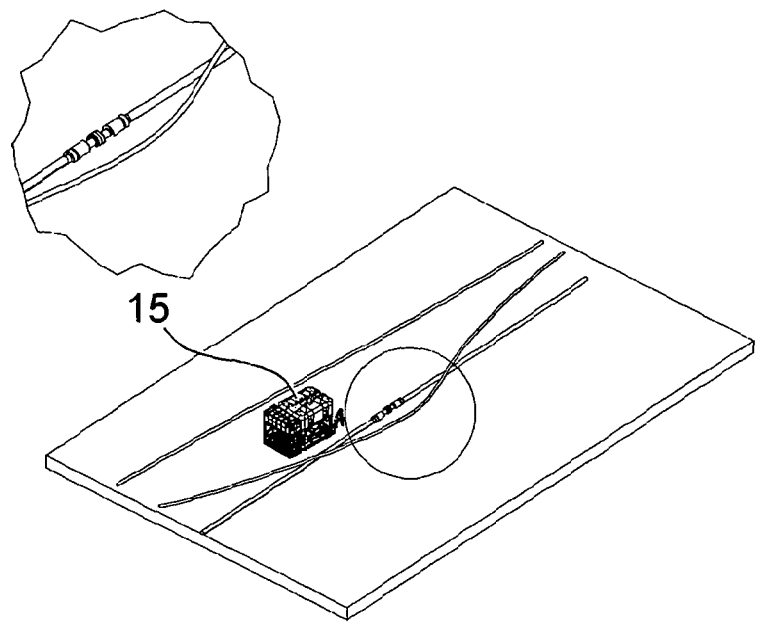
Figure 8:
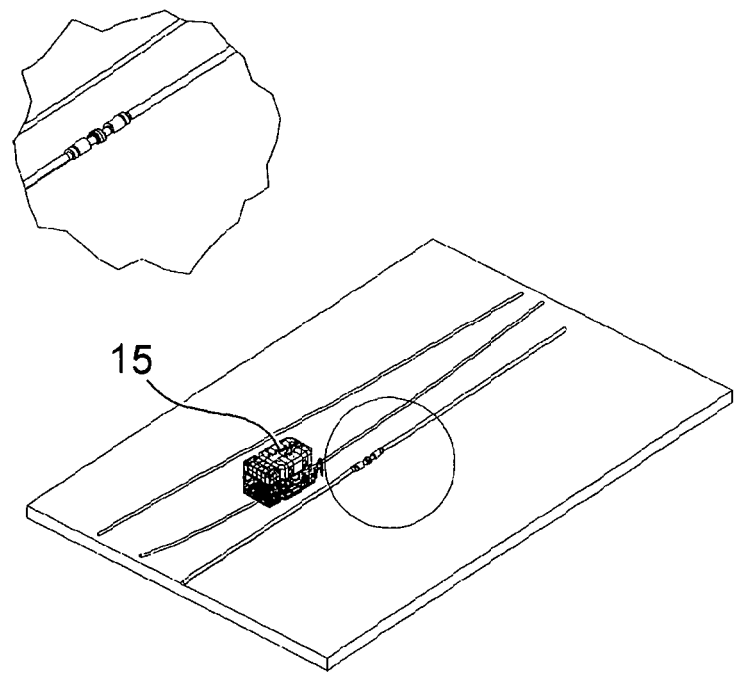
Figure 9:
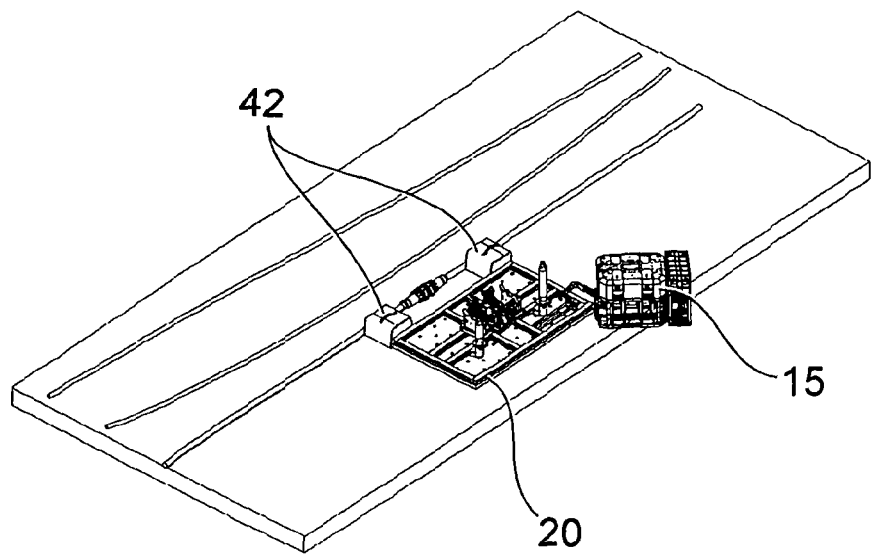
Figure 10:
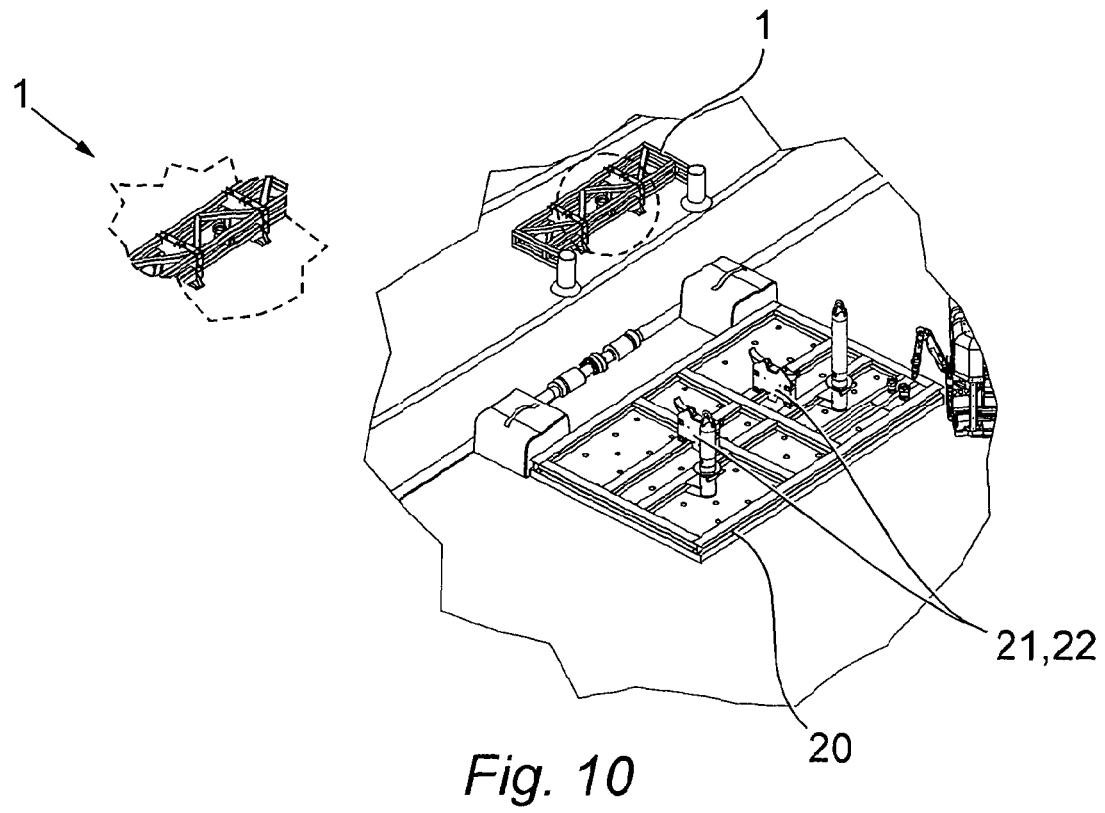
Figure 11:
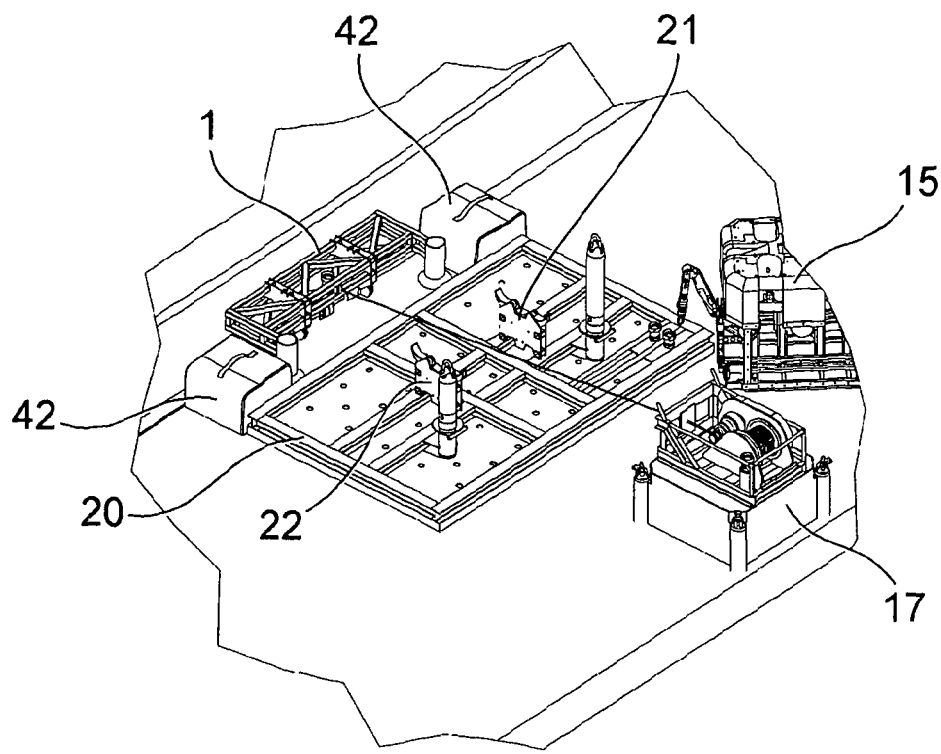
Figure 12:
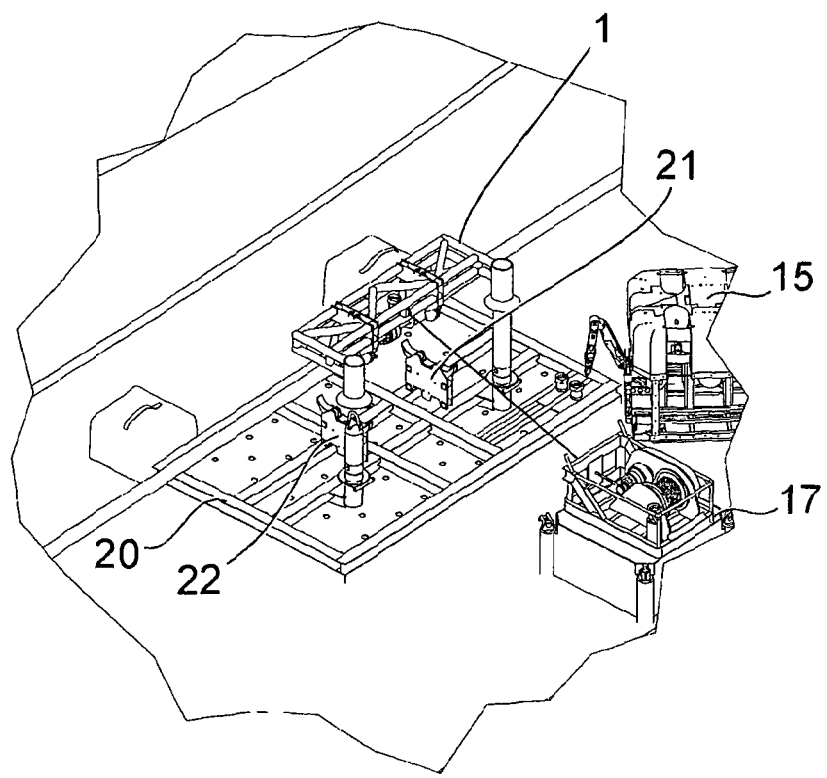
Figure 13:
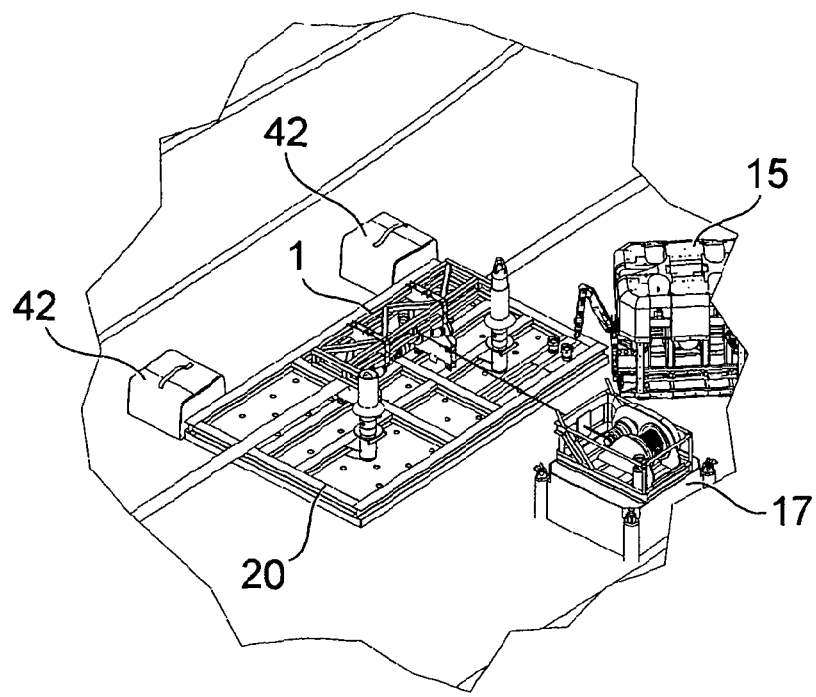
Figure 14:
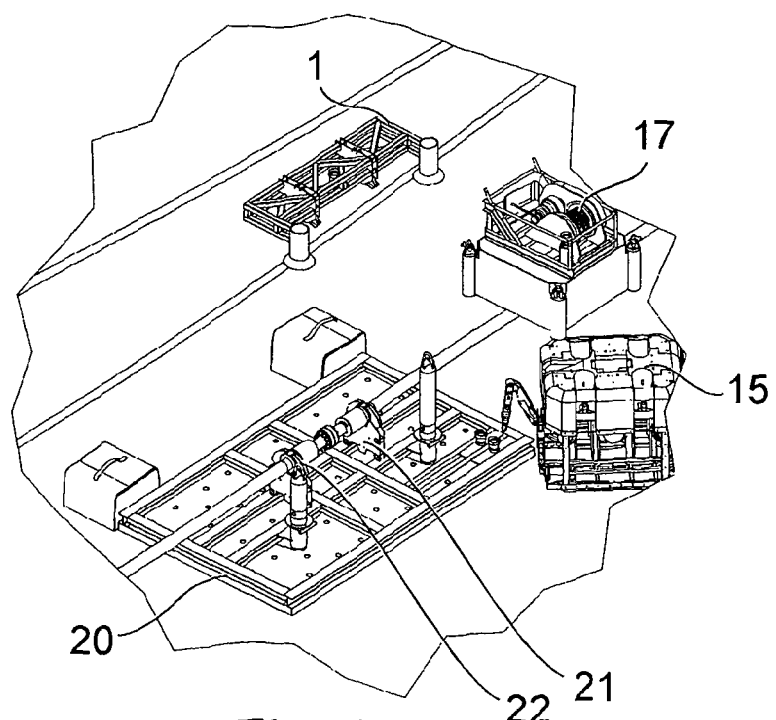
Figure 21:
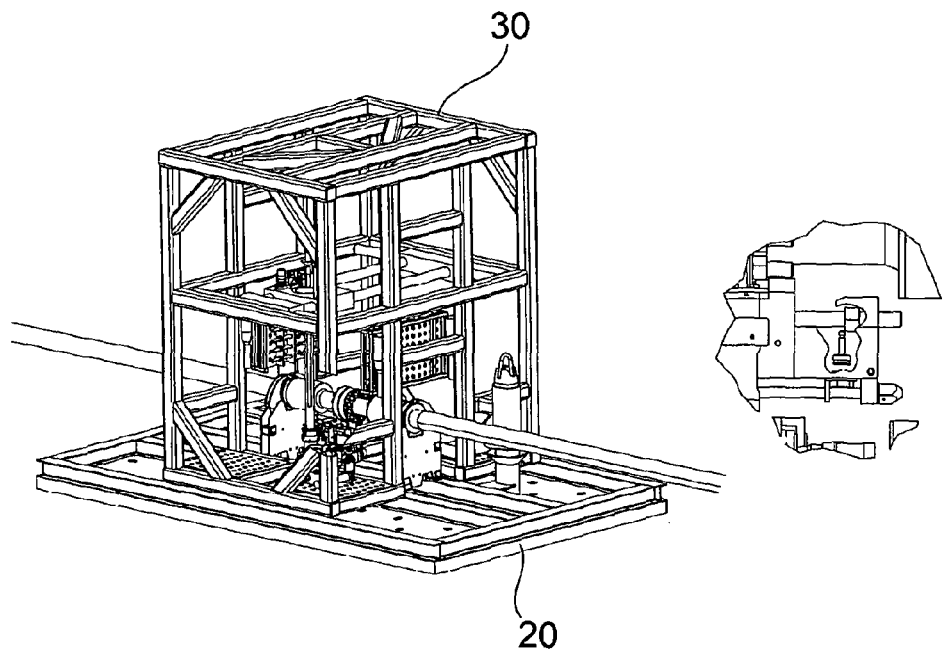
Figure 22:
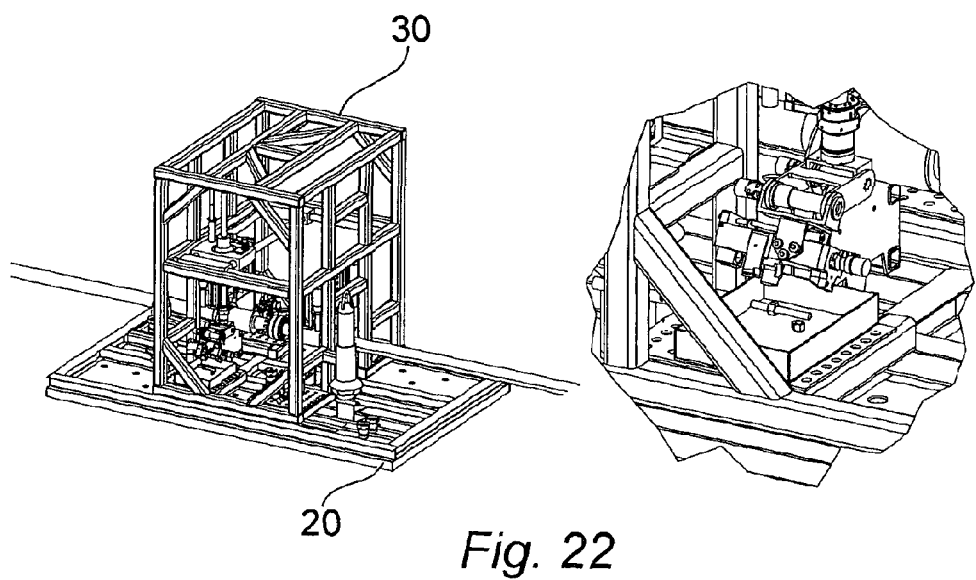
Figure 23:
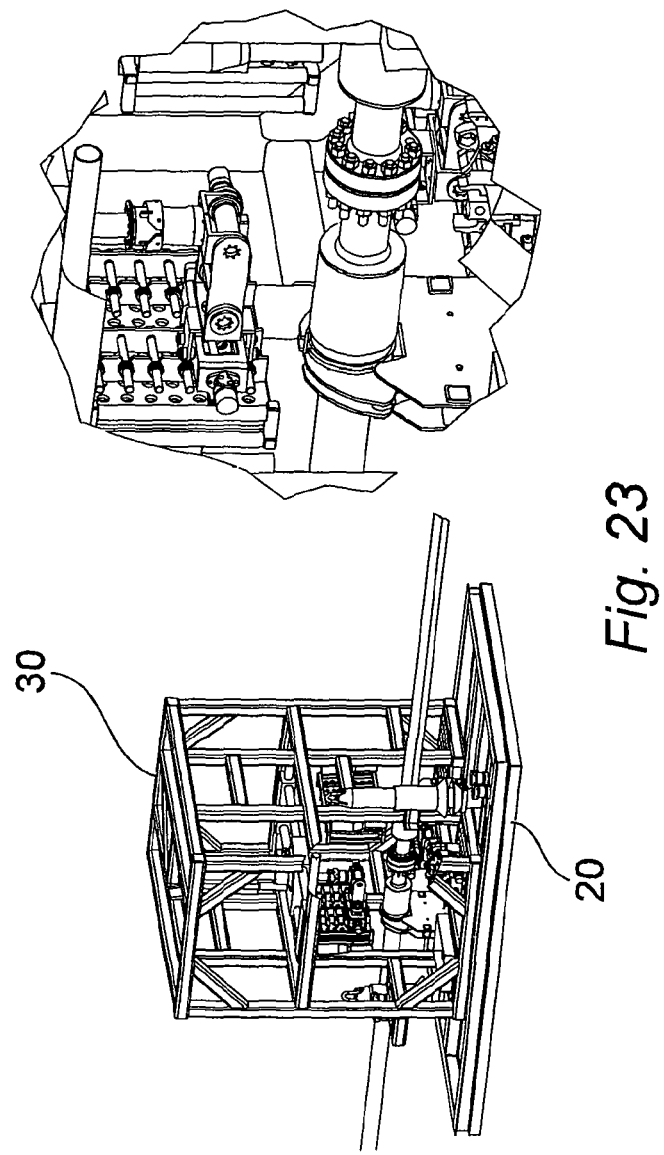
Figure 25:
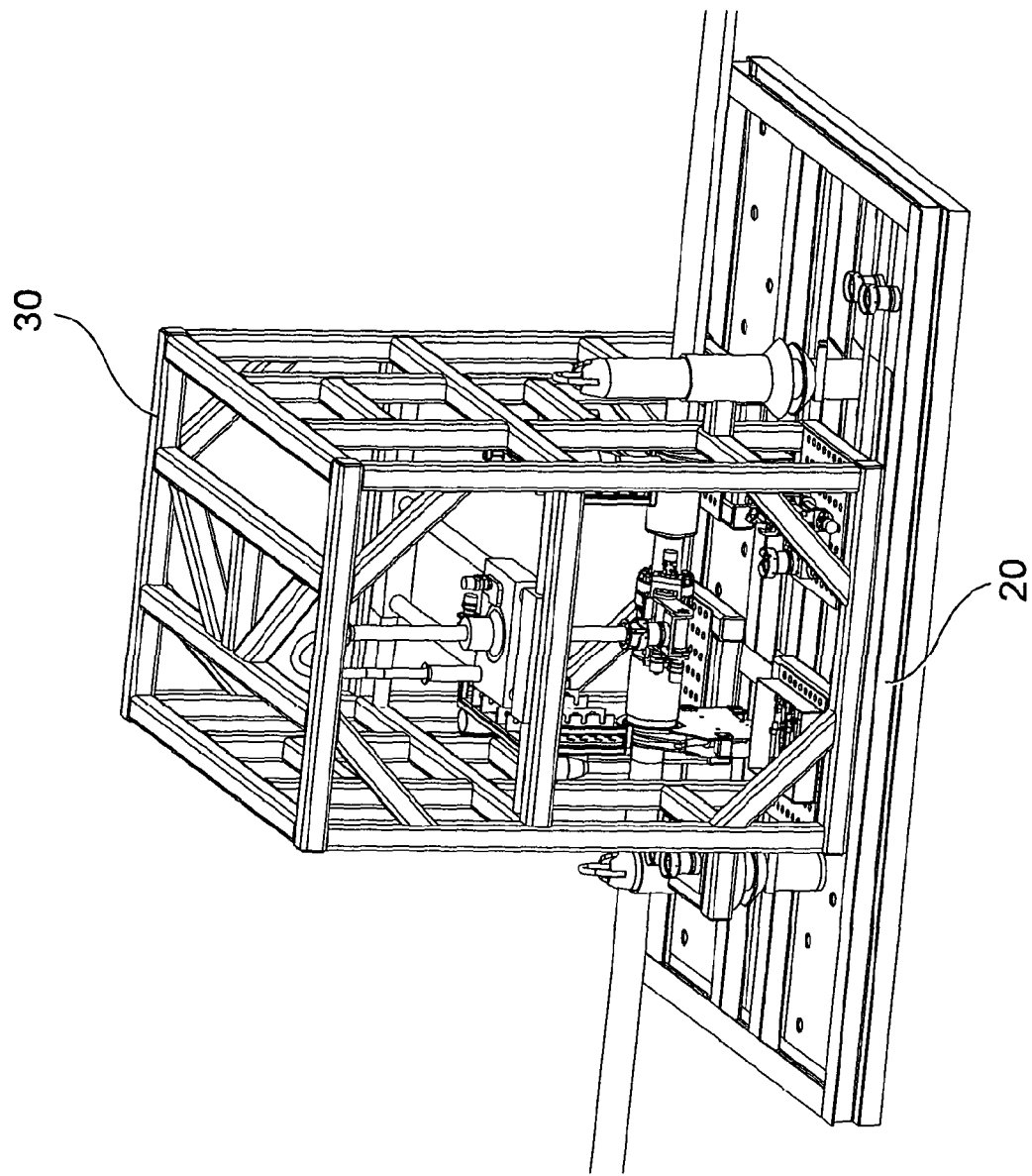

Referring now to FIG. 6, a robotic tool structural frame 30 supports and contains the tooling sub-assemblies required to perform a complete flange studbolt and nut removal and replacement operation. The tool structural frame 30 houses inter alia a three-dimensional XYZ translation unit 33 for movement of a robotic arm 31 within the frame around a work zone within the frame 30. The robotic arm 31 is equipped with a torque tool 32 for manipulating and replacing a fastener such as a studbolt and nut assembly.

The XYZ translation unit robotic arm 31 includes an end-effector interchange interface used to connect to, and disconnect from, the tools during the course of normal and, if necessary, contingency operations. Thus the torque tool 32 is removable and may be substituted by another tool.

Contingency tooling may be stored within the structural frame 30. In its simplest form this may comprise a nut cracker and stud replacement tool 39 that can be used should the existing studbolt and nuts be found to be seized and unable to be removed using the torque tool. In this event the XYZ translation unit would position the torque tool in its parking location within the structural frame 30 before disconnecting the tool 32 from the end-effector interchange interface. The XYZ Unit would then relocate and connect to the nut cracker and stud replacement tool 39 before commencing contingency operations. Upon completion of the contingency operation an end-effector/tool change-out sequence would be repeated to re-instate the torque tool 32 so that normal operations could recommence.

The tool structural frame 30 also houses a storage rack 34 within accessible reach of the robotic arm 31, and presenting replacement fastener assemblies including both studbolts and corresponding nuts in an accessible but secure manner. A work basket 40 is provided to collect the removed fastener assemblies (used studbolts and nuts)

The structural frame is provided with a pair of external docking cone sockets 35, 36 to engage with corresponding docking guide posts 23, 24 on the base support frame 20.

The XYZ translation tool and all associated tooling can be hydraulically operated and provision is made for supplying hydraulic power from an ROV via hydraulic stabplate connectors (not shown) that connect to a pair of hydraulic stabplate receptacles 37, 38 located on the structural frame 30.

A hydraulic and electrical control system is used to power and control all of the robotic tool systems. In order to minimise operational duration periods, hydraulic actuators for the XYZ translation tool may have the capability to provide positional feedback via electronic sensors. This allows fastener replacement to be automated.

In a foreseeable use of the apparatus described above the following operational actions are contemplated.

A remotely operated vehicle (ROV) 15 is used to inspect the proposed worksite where an intervention upon a flange-coupling in a conduit to effect remedial work is contemplated. The ROV 15 may be used to clear any debris or obstructions preventing access to the flange coupling. This could include having to reposition a flowline or umbilical. The operational apparatus including the lift clamp 1, base support frame 20, and tool-containing structural frame 30 are lowered from a support vessel and wet stored on the seabed in a convenient location adjacent to the worksite. More than one ROV 15 may be used or at least an additional ROV may be on station for use to assist another if required.

Gabions 42 (sandbags) are lowered from the support vessel in a work basket and wet stored on the seabed in a convenient location adjacent to the worksite at a flowline 50, with fluid tight flange-coupling 51 connecting tubular components 52, 53, of the flowline 50.

With assistance from the vessel crane as required, the gabions 42 are positioned by the ROV 15 against the target flowline 50 to aid the subsequent positioning and installation of the flange-coupling handling and intervention tool apparatus.

Figure 5:
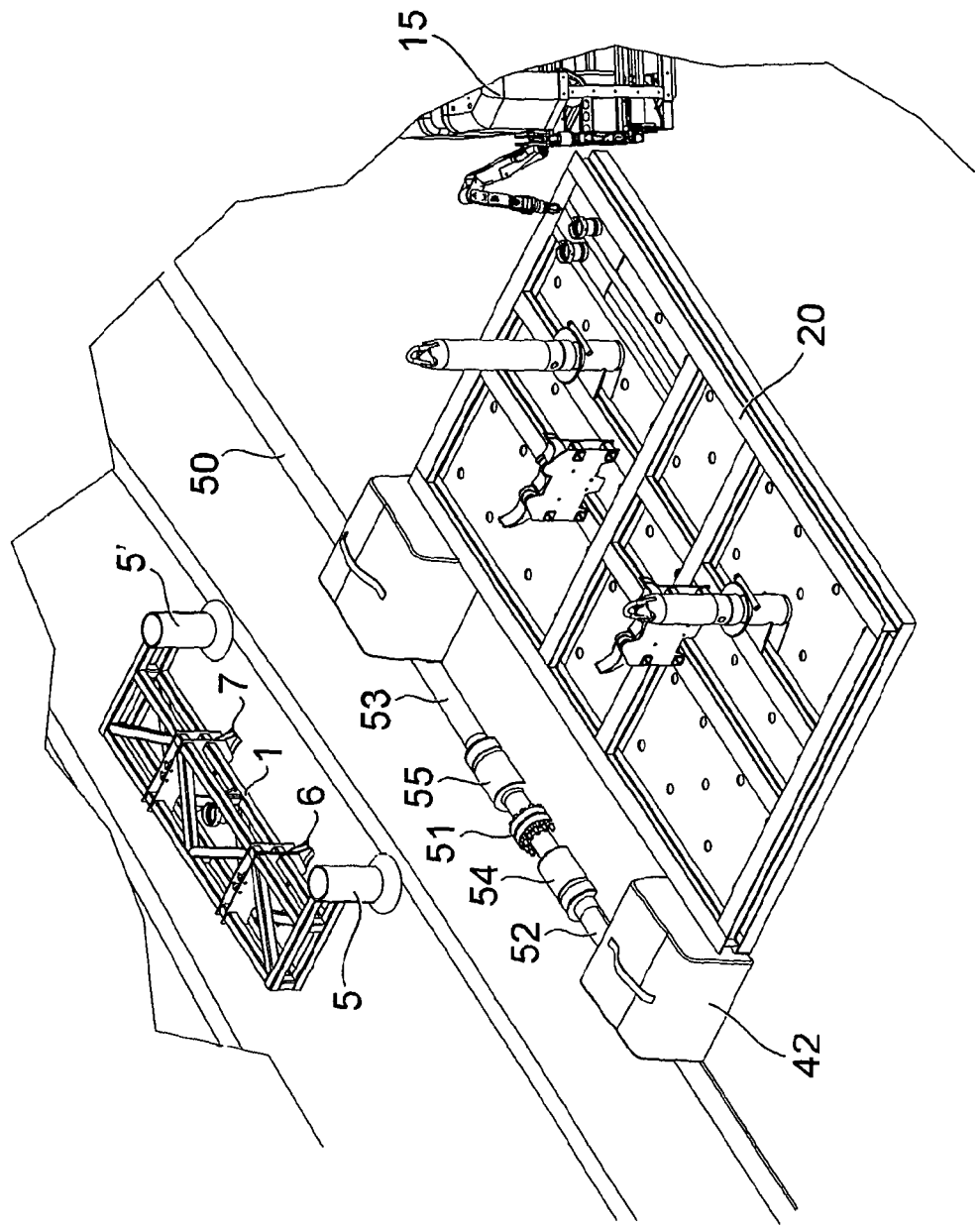
FIG. 5 shows a perspective view of the base frame of FIG. 4 positioned next to a seabed flowline where an intervention upon a flange-coupling between tubular components of the flowline is required.

Referring to FIG. 5 in conjunction with FIG. 1, the base support frame 20 is guided into position by the ROV 15 and installed on the seabed against the gabions 42.

If necessary, the ROV 15 performs local seabed dredging operations at the flange coupling end fittings to aid installation of the lift clamp 1.

A subsea winch 17 may be lowered to the worksite by the support vessel crane and the ROV 15 may position the subsea winch on the seabed appropriately.

With the aid of the support vessel crane the ROV recovers the lift clamp 1 and positions it over the flange coupling so that gripping devices 6, 7 thereof are respectively aligned over the coupled end fittings 54, 55 of the tubular components making up the flowline 50 and operated to clamp the lift clamp 1 in place upon the flowline to hold the flange-coupled tubular component ends securely.

A first ROV may attach a subsea winch cable to the lift clamp 1 whilst another ROV operates the subsea winch.

With the aid of the vessel crane and subsea winch 17 the lift clamp 1 with the flowline clamped to it is lifted from the seabed. The engagement mechanism in this embodiment guides the engagement of the lift clamp 1 with the support frame 20, adjusting the alignment of the lift clamp 1 relative to the support frame 20 as the winch lowers it into position on the support frame 20. The guide posts 23, 24 are used to locate the flowline within the capture of the support frame clamp jaws 21, 22. The pair of external docking cone sockets 35, 36 engage with the corresponding docking guide posts 23, 24 to align the flange-coupling 51 between the support frame clamps 21, 22 so that the flange-coupling 51 is aligned with the support frame clamps 21, 22. The clamps 21, 22 are closed to support the coupling 51 thereby ensuring the fluid integrity of the flange-coupling 51 during subsequent operations.

Upon completion of the flowline lift and shift the ROV operates the support frame clamps 21, 22 to grip the respective tubular component end fittings 54, 55.

The ROV disconnects the subsea winch cable from the lift clamp 1. The subsea winch can thereafter be optionally recovered to surface. The ROV releases the lift clamp 1 from the respective tubular component ends 54, 55 and, using the vessel crane, removes the lift clamp 1 from the support frame 20 to be set aside near the work site for later use.

With assistance from the vessel crane the ROV retrieves the tool-containing structural frame 30 and installs it on the support frame 20 using the guide posts 23, 24 for docking location purposes.

The ROV operates the robotic arm 31 and torque tool 32 to perform the removal of a defective studbolt; the removed studbolt and nuts can be stored in a basket 40 within the structural frame 30.

The ROV operates the robotic arm 31 to access the storage rack 34 to obtain a new studbolt and nut; the torque tool 32 is used to install the replacement studbolt and nuts. These removal and installation actions are repeated as often as is necessary to replace the defective fasteners.

The ROV operates the robotic arm and torque tool to perform a final clock-face stud tightening sequence to complete the replacement operation.

The worksite is de-rigged and all equipment recovered to the support vessel in a reverse of the set-up sequence. The flowline is typically also returned to its original position on the seabed. The ROV 15 typically performs a final visual inspection of the worksite.

Variants in the described method are contemplated to suit operational needs.

The invention claimed is:

1. Apparatus for handling a flange coupling between a first conduit component and a second conduit component such that the flange coupling remains fluid-tight, the apparatus comprising:
    a lifting frame adapted to bear the first conduit component and the second conduit component while the flange coupling is moved, the lifting frame comprising a first gripping mechanism configured to straddle the flange coupling and to grip both the first conduit component and the second conduit component;
    a base frame adapted to receive the flange coupling at a seabed location the base frame comprising a second gripping mechanism adapted to receive the flange coupling when the lifting frame is engaged with the base frame such that the coupled components are gripped on each side of the flange coupling so that the flange coupling remains fluid-tight; and
    at least one engagement mechanism configured to guide the lifting frame and the base frame into engagement with each other.

2. Apparatus as claimed in claim 1, wherein the at least one engagement mechanism controls an alignment of the lifting frame and the base frame during engagement so that the first and second conduit components and the flange coupling gripped by the lifting frame are aligned with the second gripping mechanism.

3. Apparatus as claimed in claim 1, wherein the lifting frame is configured for axial adjustment of the first gripping mechanism with respect to the flange coupling.

4. Apparatus as claimed in claim 1, wherein the first gripping mechanism comprises at least first and second clamp devices mounted upon the base frame and spaced apart sufficiently to be positioned respectively on either side of a flange coupling when juxtaposed therewith.

5. Apparatus as claimed in claim 4, wherein the at least first and second clamp devices comprise adjustable jaws to accommodate differing sizes of conduit components.

6. Apparatus as claimed in claim 1, wherein the second gripping mechanism is adapted to receive the first and second conduit components and the flange coupling when the lifting frame is properly juxtaposed with the base frame.

7. Apparatus as claimed in claim 1, including a tool adapted to be positioned upon the base frame and comprising an arm movable around the flange coupling, wherein the arm is adapted for engaging a fastener and for manipulating the fastener to release or tighten it.

8. Apparatus as claimed in claim 7, wherein the arm is a robotic arm equipped with a tool to apply torque to the fastener.

9. Apparatus as claimed in claim 7, wherein the arm is a robotic arm mounted in a separate tool frame that is adapted for location upon the base frame.

10. A method for handling a flange coupling between a first tubular component and a second tubular component such that the flange coupling remains fluid tight, the method comprising:
    mounting the first tubular component and the second tubular component on a lifting frame having a first gripping mechanism by positioning the first gripping mechanism to straddle the flange coupling between the ends of said first and second tubular components and by gripping both the first and second tubular components with the gripping mechanism;
    lifting the gripped first and second tubular components, bearing a weight of the first and second tubular components on the lifting frame and moving the lifting frame to a base frame positioned on a seabed, wherein the base frame comprises a second gripping mechanism;
    guiding the lifting frame and the base frame into engagement with each other with at least one engagement mechanism; and
    presenting the first and second tubular components to the base frame so that gripping devices of the second gripping mechanism are located on either side of the flange coupling and operating the gripping devices of the second gripping mechanism to grip the first and second tubular components while the first and second tubular components are still gripped by the first gripping mechanism.

11. A method as claimed in claim 10, comprising removing the lifting frame from the first and second tubular components by releasing the first gripping mechanism, leaving the first and second tubular components securely held by the second gripping mechanism on the base frame.

12. A method as claimed in claim 10, comprising performing the method at a subsea site by use of at least one remotely operated vehicle (ROV).

13. A method as claimed in claim 10, wherein the first and second tubular components form part of an operational flowline and further comprising performing the method without disrupting operational use of the flowline.

14. A method as claimed in claim 10 including the step of aligning the lifting frame with the base frame.

15. A method as claimed in claim 10 including the step of engaging the lifting frame and the base frame with one another.

16. A method as claimed in claim 10 including the step of positioning a tool on the base frame, the tool comprising an arm movable around the flange coupling, wherein the arm is adapted for engaging a fastener and manipulating the fastener to release or tighten it.

* * * * *